UNITED STATES PATENT OFFICE.

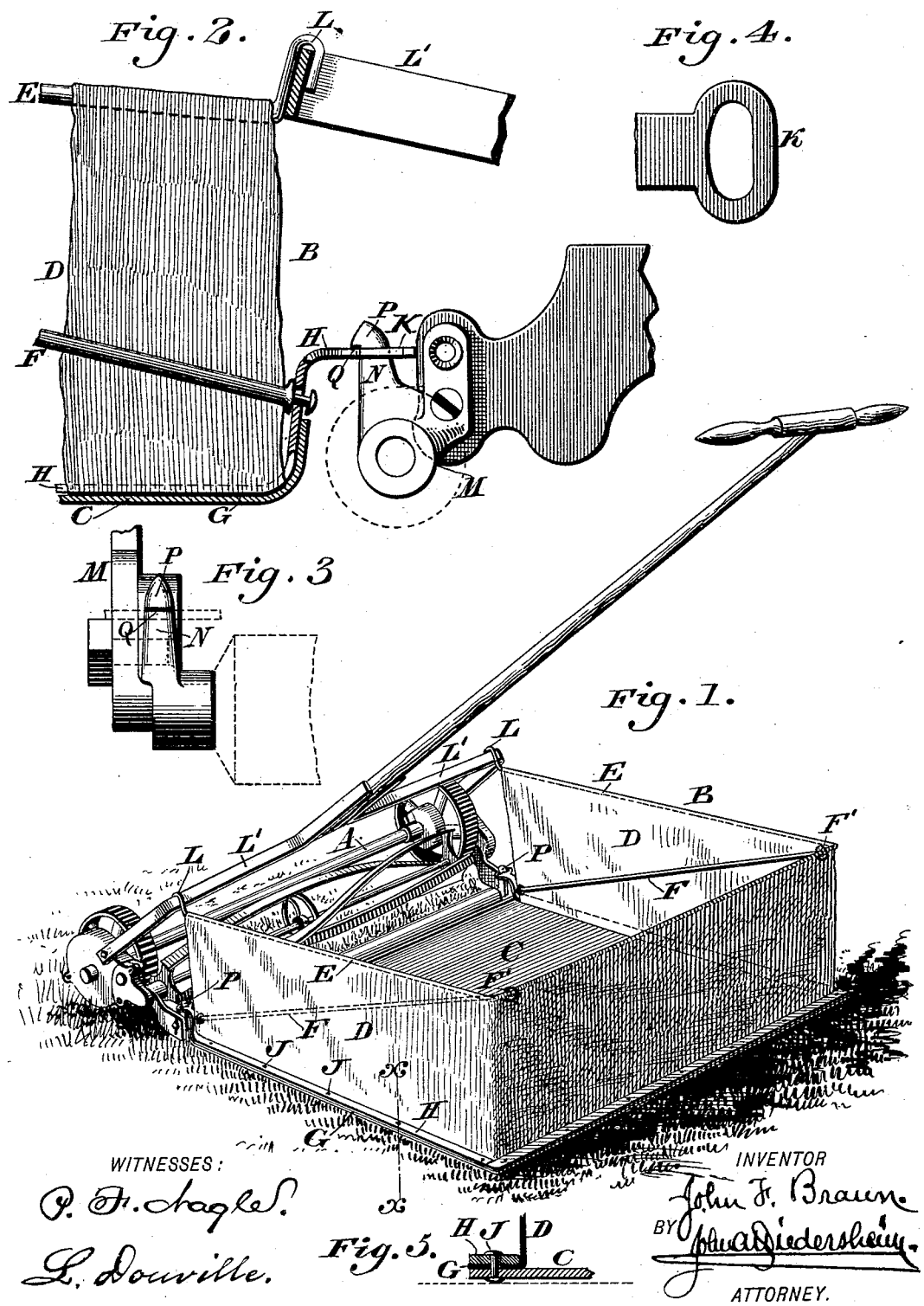

JOHN F. BRAUN, OF PHILADELPHIA, PENNSYLVANIA, ASSIGNOR TO JOHN BRAUN & SONS, OF SAME PLACE.

GRASS-BOX FOR LAWN-MOWERS.

SPECIFICATION forming part of Letters Patent No. 493,612, dated March 14, 1893.

Application filed December 24, 1891. Serial No. 416,035. (No model.)

*To all whom it may concern:*

Be it known that I, JOHN F. BRAUN, a citizen of the United States, residing in the city and county of Philadelphia, State of Pennsylvania, have invented a new and useful Improvement in Grass-Boxes for Lawn-Mowers, which improvement is fully set forth in the following specification and accompanying drawings.

My invention consists of a grass box for a lawn mower which is formed of a frame, sides of canvas or other fabric, a metallic bottom, and braces which extend diagonally from the top to the bottom of the frame, forming trusses as hereinafter set forth.

It also consists of a novel manner of connecting the fabric with the bottom.

It also consists of novel means for connecting a grass box with a mower.

Figure 1 represents a perspective view of a grass box for a lawn mower embodying my invention. Fig. 2 represents a vertical section on an enlarged scale. Fig. 3 represents a front view of one of the roller brackets. Fig. 4 represents a top of plan view of one of the attaching ears of the grass box. Fig. 5 represents a vertical section of a portion of the grass box on line $x$, $x$, Fig. 1, on an enlarged scale.

Similar letters of reference indicate corresponding parts in the several figures.

Referring to the drawings: A designates a lawn mower which, excepting the features of my invention applied thereto, is of well known form.

B designates a grass box or gatherer, the same being formed of a metal bottom C, sides D of fabric, top frame E, and braces F, the latter holding-up said sides, and forming with the top frame, trusses, as will be hereinafter explained. The lower edges of the sides D are turned outwardly upon the top of the bottom C, around the edges thereof, as at G, and strips H of metal are placed upon said edges G. Rivets J are passed through the strips, edges, and bottom and headed, whereby the sides and bottom are firmly connected.

The frame E distends the top of the box B, and the braces F extend from the rear of said frame diagonally to the front ends of the strips H, said ends being turned up and terminating in ears K, as shown in Figs. 2 and 4.

The rear ends of the braces have eyes F' which freely encircle said frame E, and their front ends are loosely riveted to strips H.

The front ends of the frame E have hooks L thereon, as shown in Figs. 1 and 2. The ears K are adapted to be connected with the roller brackets M of the mower, while said hooks L are adapted to be hung upon the handle braces L'. Rising from said brackets are posts N, which are provided with heads P, forming the shoulders Q, it being seen that the ears K are fitted directly upon said posts, and the front walls of the slots of said ears bear upwardly against said shoulders Q, by which provision the ears are prevented from rising. Then as the hooks L engage with the handle brace L', and are prevented from dropping, it is evident that the box is connected with the mower in a firm, convenient and simple manner, it being also evident that the box is light, strong and serviceable.

The grass from the mower readily enters the box, and may be removed by hand or by overturning the box, which may be readily accomplished by properly moving the handle of the mower, without disconnecting the box. The slots of the ears K are elongated laterally, so that said ears are adapted to engage with posts on the roller brackets that may be separated to a greater or less distance on the mower.

By properly manipulating the ears K, and raising the hooks L, the box may be readily removed from the mower, and owing to the pliable nature of the sides of the same, said sides may readily fold upon the bottom of the box, in compact form, convenient for storage, handling or transportation.

In the construction of the bottom C, sheet metal is preferred, the same being light, strong and durable.

Owing to the braces F, a portion of the weight of the box is sustained by the roller brackets, thereby lessening the weight on the handle braces L'.

Having thus described my invention, what I claim as new, and desire to secure by Letters Patent, is—

1. A grass box consisting of a top frame with hooks, a bottom and sides with diagonal braces, ears and strips secured to said frame, said braces being loosely secured at one end to said strips, and at the other end to said top frame, all combined substantially as described.

2. A grass box for a lawn mower formed of a top frame, a bottom and flexible sides with diagonal braces, said top frame having hooks for engaging the handle of the mower, and the braces having eyes at their upper ends connected with the top frame and secured at their lower ends to the bottom of the box said bottom having ears adapted to be secured to posts on the mower, all combined substantially as described.

JOHN F. BRAUN.

Witnesses:
   JOHN A. WIEDERSHEIM,
   A. P. JENNINGS.